(12) United States Patent
Kilpatrick

(10) Patent No.: US 8,245,344 B2
(45) Date of Patent: Aug. 21, 2012

(54) CLEANING APPARATUS

(75) Inventor: Tim F. Kilpatrick, Hambleton (GB)

(73) Assignee: Milikraft Limited, Blackpool, Lancashire (GB)

( * ) Notice: Subject to any disclaimer, the term of this patent is extended or adjusted under 35 U.S.C. 154(b) by 1002 days.

(21) Appl. No.: 11/721,860

(22) PCT Filed: Nov. 29, 2005

(86) PCT No.: PCT/GB2005/004554
§ 371 (c)(1),
(2), (4) Date: Aug. 28, 2008

(87) PCT Pub. No.: WO2006/064180
PCT Pub. Date: Jun. 22, 2006

(65) Prior Publication Data
US 2009/0211039 A1 Aug. 27, 2009

(30) Foreign Application Priority Data
Dec. 18, 2004 (GB) .................................. 0427804.0

(51) Int. Cl.
*A46B 13/02* (2006.01)
*B60S 3/06* (2006.01)
(52) U.S. Cl. ............................ 15/21.1; 15/53.4; 15/88.4
(58) Field of Classification Search ................... 15/21.1, 15/59, 65, 88.2, 88.3, 53.4, 88.4
See application file for complete search history.

(56) References Cited

U.S. PATENT DOCUMENTS

| | | | |
|---|---|---|---|
| 3,091,776 A * | 6/1963 | Roberts | ............................ 4/606 |
| 5,025,523 A | 6/1991 | Zappa et al. | |
| 5,156,634 A | 10/1992 | Yang | |
| 5,263,219 A | 11/1993 | Jibiki | |
| 5,600,861 A | 2/1997 | Saito et al. | |

FOREIGN PATENT DOCUMENTS
DE 35 39 858 7/1987
GB 2293965 4/1996

OTHER PUBLICATIONS
GB0427804.0 Search Report, 1 page, Dated Jun. 28, 2005.

* cited by examiner

*Primary Examiner* — Randall Chin
(74) *Attorney, Agent, or Firm* — Michael Best & Friedrich LLP

(57) ABSTRACT

Cleaning apparatus has a matrix of brush assemblies (10) mounted on a support member (11) such that they are movable both in rotation (x) and in an axial direction (y). The brush assemblies comprise a cleaning brush (15) axially moveable within a gear wheel (22) and rotatable therewith during normal use. Each gear wheel meshes with an adjacent gear wheel to ensure that rotation of one brush causes rotation of the rest of the brushes in the matrix. When any given brush is retracted fully in an axial direction it is disconnected from its respective gear wheel such that it does not rotate therewith and is effectively removed from the drive chain.

25 Claims, 2 Drawing Sheets

CLEANING APPARATUS

CROSS-REFERENCE TO RELATED APPLICATION

This patent application is a national stage filing under 35 U.S.C. 371 of International Application No. PCT/GB2005/004554, filed 29 Nov. 2005, and claims priority to British Patent Application No. 0427804.0, entitled "Cleaning Apparatus," filed 18 Dec. 2004, by Tim F. Kilpatrick.

BACKGROUND

The present invention relates to cleaning apparatus and in particular to such apparatus for use in cleaning uneven, irregular or complex surfaces.

Many objects that require cleaning on a regular basis do not have smooth and flat surfaces rendering their cleaning difficult. Some surfaces may just be difficult to reach practically whereas others may be wholly inaccessible to the cleaning device used. The cleaning operation of such surfaces is both labour-intensive and time-consuming and often areas or parts of the object are not cleaned satisfactorily in that they remain soiled or dirty. One example of such an object is the central part of the wheel of a vehicle such as a motor car/automobile. A hub cap of the wheel often has a surface with apertures, recesses or grooves and in some instances can include a plurality of overlapping radial spokes.

SUMMARY OF THE INVENTION

It is an object of the present invention to obviate or mitigate the aforesaid and other disadvantages.

According to the present invention there is provided cleaning apparatus comprising a support member supporting a plurality of cleaning members for rotational movement, transmission means engaged with each cleaning member and for converting a driving force into rotation of the cleaning members, each cleaning member being movable relative to said support member between an extended position and a first retracted position whereby the cleaning members remain in driving engagement with said transmission means in both positions.

The cleaning member is preferably movable to an infinite number of positions between the extended position and the first retracted position.

Preferably the cleaning member is movable to a second retracted position where it is closer to the support than when in said first retracted position and in which the cleaning member is disengaged from said transmission means so that it is not driven in rotation.

Ideally the cleaning members are biased towards the extended position. This may be achieved by a spring acting between the cleaning member and the support member.

Transmission means may comprise a wheel associated with each cleaning member and rotatable therewith when the cleaning member is in said extended and first retracted position. The wheels of each of the cleaning members are ideally in driving engagement with each other so that rotation of one of the cleaning members causes rotation of the others.

The wheels may be toothed wheels that mesh with one another but in other embodiments they may be in friction engagement.

The cleaning member may comprise a shaft that is received in a sleeve, the shaft defining a longitudinal axis and being axially movable relative to said sleeve, the outside surface of sleeve defining said wheel. Preferably the wheel is defined by a flange on the outer surface of the sleeve.

Ideally the shaft is connected to said sleeve for rotation together when the cleaning member is in said extended or first retracted position. The shaft is ideally disconnected from sleeve when in the second retracted position.

Preferably the shaft and sleeve are connected by a key and keyway connection so that the shaft is slidable in said sleeve between the extended and retracted positions.

The shaft is preferably stepped so as to define a reduced diameter portion that when aligned with said sleeve is not engaged therewith, so that the sleeve rotates around the shaft.

Ideally the sleeve is supported in an aperture in the support member, the sleeve being rotatable in said aperture.

The shaft may have a lower portion that supports cleaning elements which are preferably resiliently flexible. The cleaning elements may extend radially and may be spaced radially and axially along the lower portion of shaft. The elements are preferably flexible and more preferably resiliently flexible.

A specific embodiment of the present invention will now be described, by way of example only, with reference to the accompanying drawings in which:

DETAILED DESCRIPTION

Figure 1:
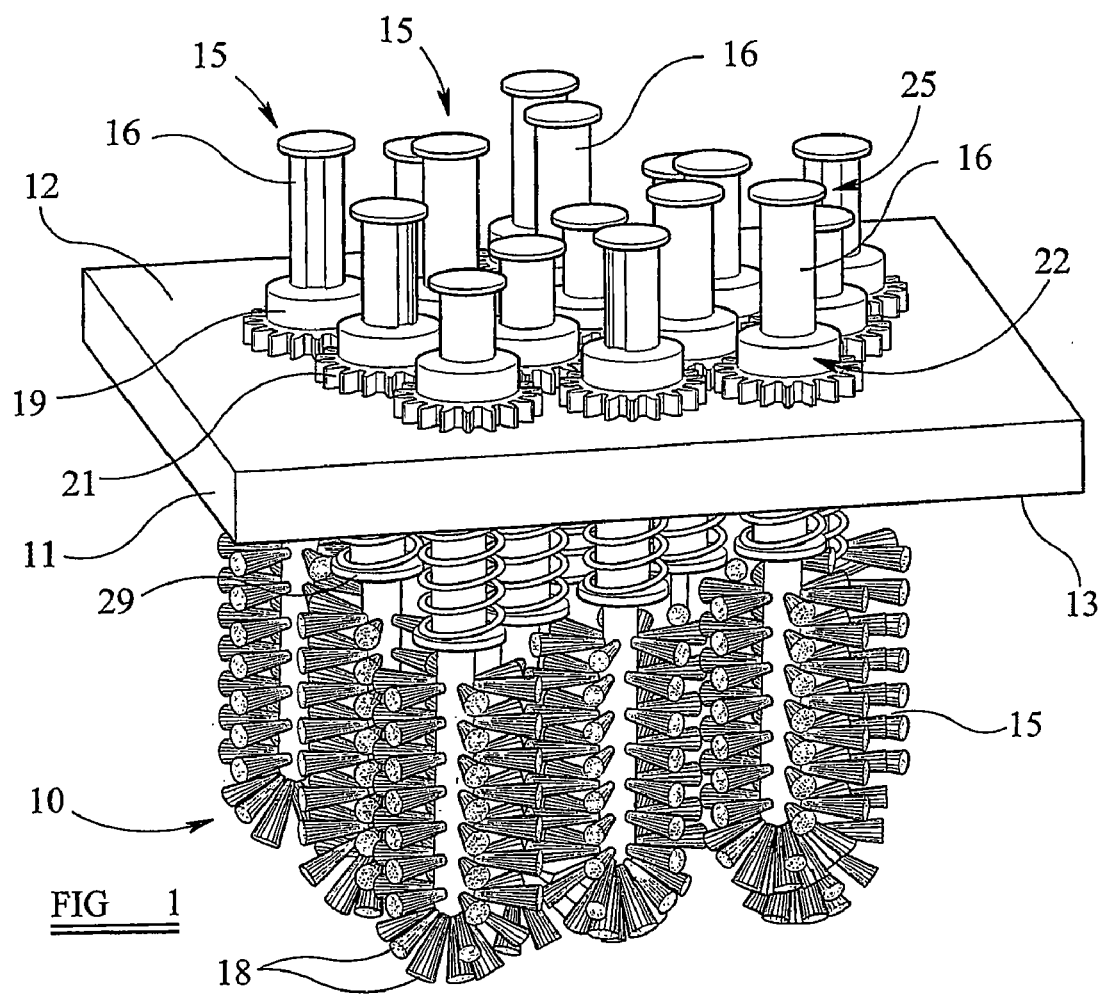
FIG. 1 is a perspective view from the side of the cleaning apparatus of the present invention.

Referring now to the drawings, the exemplary cleaning apparatus has a matrix of cleaning brush assemblies 10 that are supported in a frame 11.

The frame 11 is depicted in the exemplary embodiment as an approximately square, rigid panel with planar surfaces but may take any convenient form according to the particular cleaning application.

The frame 11 has an upper surface 12, a lower surface 13 and a plurality of apertures 14 that extend between the surfaces 12, 13 and in which the brush assemblies 10 are supported for rotation and axial movement.

Each brush assembly comprises a brush 15 with an upper elongate shaft 16 that is received in one of said apertures 14 and a coaxial lower spindle 17 that provides support for a plurality of radially extending bristles 18.

The shaft 16 of each brush 15 is supported in a concentric sleeve 19 that forms part of the brush assembly. The sleeve 19 has a peripheral radially extending flange 20 with a toothed outer surface 21 that defines a gear wheel 22 disposed immediately above an upper surface 12 of the frame 11. The sleeve 19 extends through the aperture 14 and has a shoulder 23 that abuts the lower surface 13 of the frame 11. The brush assemblies 10 are arranged in a matrix in the frame 11 such that the toothed gear wheels 22 mesh with each other.

The lower spindle 17 of the brush is a thin-walled hollow cylinder that is resiliently flexible such that it is able to deflect under relatively high loads and to regain its shape when the load is removed. It is also rigid enough to maintain its shape when subjected to relatively small loads and to provide support for the bristles 18 of the brush that are fixed in apertures 24 disposed at regular axial and radial intervals along and around the spindle 17. In the embodiment shown in the figures the bristles 18 are approximately conical in shape with the small diameter end being received in a spindle aperture 24. It will be understood that the bristles can take any suitable form and can be made of any suitable material providing they provide abrasive or scouring qualities during the cleaning operation. Example materials are steel and nylon.

Figure 2:
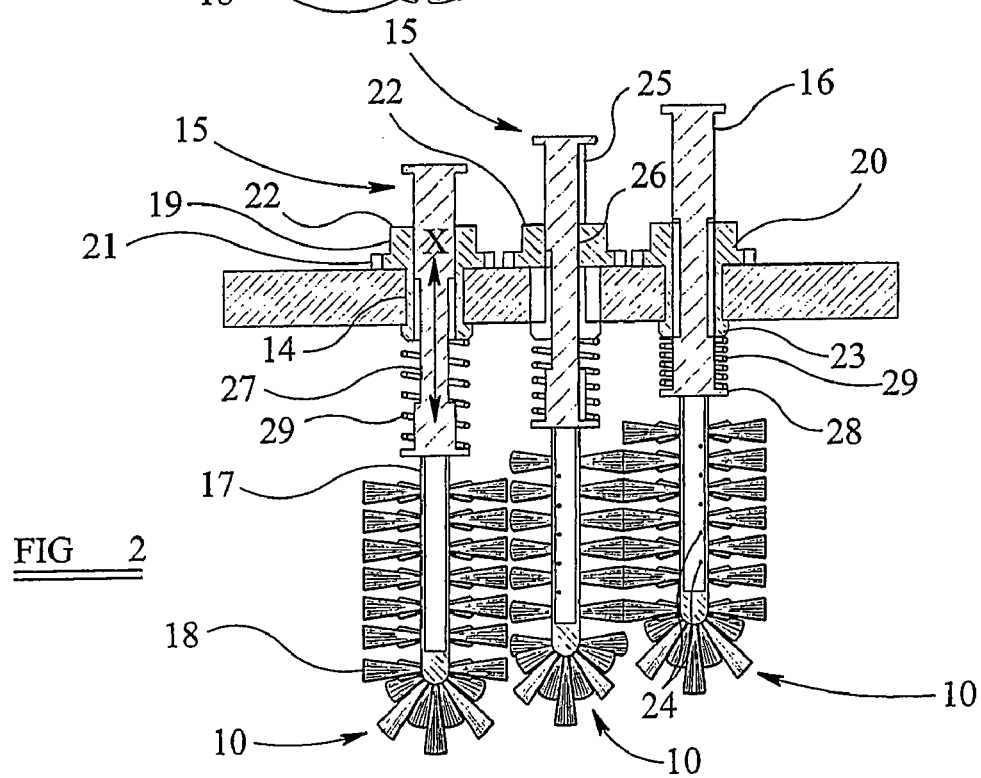
FIG. 2 is a sectioned view illustrating three different brush assemblies of the apparatus of FIG. 1, the brushes being depicted in different axial and rotational positions.

The upper shaft 16 of the brush assembly 10 has an axially extending keyway defined on its outer surface and that is designed for receipt of a key 26 defined on the inside surface of the sleeve 19. The engagement of the key 26 and the keyway 25 is such that the brush 15 can move axially relative to the sleeve 19 (and therefore the frame) by relative sliding movement but that the brush 15 and sleeve 19 move together in a rotation direction in normal operation. In FIG. 2 the central brush is rotated such that the cross-section illustrated in FIG. 2 passes through the axial centre of the key and keyway.

Each brush shaft 16 has a middle portion that is of reduced diameter as indicated at 27. The reduced diameter portion 27 is designed to be radially clear of the key 26 in the sleeve 19 so that when the brush 15 is retracted relative to the sleeve 19 and the reduced diameter portion 27 coincides axially with the key 26 the two are disconnected.

The lower end of the brush shaft 16 terminates in a radially outwardly extending flange 28 that provides a seat for a helical compression spring 29 disposed between the flange 28 and the lower surface 13 of the frame 11. The spring 29 serves to bias the brush downwardly of the frame 11 as illustrated by the brush on the left in FIG. 2.

Figure 3:
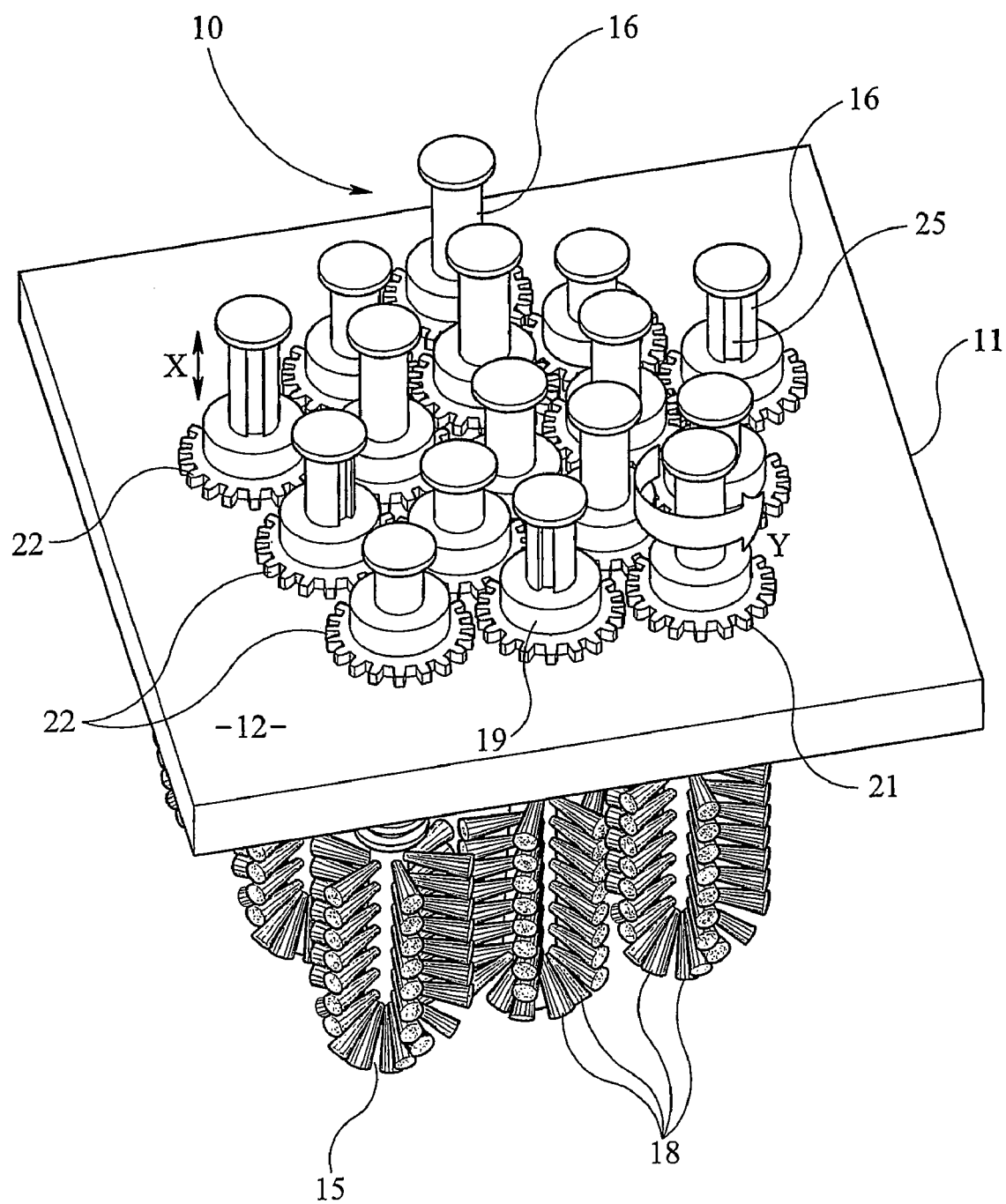
FIG. 3 is a perspective view from above of the apparatus of FIG. 1.

In operation a drive member (not shown) such as a manually operable handle, a motor or any other convenient actuator that provides rotary motion drives one of the brush assemblies 10 (i.e. the brush 15 and the sleeve 19) in rotation (see arrow Y in FIG. 3) in the frame 11. As a result of the meshed connection between the adjacent gear wheels 22 of the brush assemblies 10 all such assemblies 10 rotate in unison. The cleaning apparatus is forced against the surface of an object to be cleaned such that the bristles 18 of the brushes 15 come into contact therewith. As a result of the keyed connection between the shaft 16 and the sleeve 19 each brush 15 can retract relative to the frame 11 and sleeve 19 against the bias of the compression spring 29 (as indicated by arrow X in FIGS. 2 and 3) to any one of an infinite number of positions in response to encountering any projections or raised parts on the surface. It will be appreciated that the brush matrix in effect "moulds" itself to the shape of the surface. In normal use, as the apparatus is moved across an uneven surface the brushes reciprocate up and down in the sleeve as they rotate so as to accommodate the undulations. If necessary the surface to be cleaned can be treated with a cleaning solution such as a detergent prior to, during or after application of the apparatus.

If any given brush 15 retracts fully to a position shown on the right in FIG. 2 the middle reduced diameter portion 27 of its shaft 16 is in axial alignment with the key 26 of the sleeve. In this position there is no connection between the shaft 16 and sleeve 19. The brush 15 is thus disconnected from its gear wheel 22 and cannot rotate therewith and is thus, in effect, disconnected from the rest of the matrix without interrupting the rotation of the other brush assemblies 10. This arrangement serves as a clutch mechanism that prevents the brush 15 becoming damaged if too much force is applied and ensures that if one brush is disengaged the rest of the brushes in the matrix continue the cleaning operation.

Each brush 15 in the matrix rotates individually either clockwise or anticlockwise and thus performs its own cleaning operation. This individual brush cleaning operation allows for cleaning of objects such as spokes or apertured surfaces. The spring loading of the brush allows irregular or uneven surfaces to be cleaned effectively. It also allows for side walls of apertures to be cleaned.

It is to be understood that the apparatus can be used in many different applications from the cleaning of large surfaces such as roads or floors to smaller objects such as vehicles or parts thereof. It may be designed to be hand-held or may form part of a larger cleaning device or machine.

It will be appreciated that numerous modifications to the above described design may be made without departing from the scope of the invention as defined in the appended claims. In particular, the size and shape of the brushes and the configuration of the matrix can be of any desired arrangement to match the application. For example the brush matrix may be rectangular, circular or irregular and the number of the brushes per unit area within the matrix may be of any desired value.

The invention claimed is:

1. Cleaning apparatus comprising a support member supporting a plurality of cleaning members for rotational movement, transmission means engaged with each cleaning member and for converting a driving force into rotation of the cleaning members, each cleaning member being movable relative to said support member between an extended position and a first retracted position whereby the cleaning members remain in driving engagement with said transmission means in both positions, characterised in that each cleaning member is movable to a second retracted position where it is closer to the support member than when in said first retracted position and is disengaged from said transmission means so that it is not driven in rotation, wherein each cleaning member comprises a shaft that is received in a sleeve, the shaft defining a longitudinal axis and being axially movable relative to the sleeve, an outside surface of the sleeve defining the transmission means, the sleeve being supported in an aperture in the support member, the sleeve being rotatable in said aperture.

2. Cleaning apparatus according to claim 1, wherein each cleaning member is movable to a plurality of positions between the extended position and the first retracted position.

3. Cleaning apparatus according to claim 1, wherein each cleaning member is biased towards the extended position.

4. Cleaning apparatus according to claim 3, further comprising a plurality of resilient members, each resilient member acting between one of the cleaning members and the support member to bias the one of the cleaning members toward the extended position.

5. Cleaning apparatus according to claim 4, wherein each resilient member is a spring.

6. Cleaning apparatus according to claim 1, wherein the transmission means comprises a wheel associated with each cleaning member and rotatable therewith when the cleaning member is in said extended and said first retracted positions.

7. Cleaning apparatus according to claim 6, wherein the wheels of the cleaning members are in driving engagement with each other so that rotation of one cleaning member causes rotation of the others.

8. Cleaning apparatus according to claim 7, wherein the wheels are toothed wheels that mesh with one another.

9. Cleaning apparatus according to claim 6, wherein the outside surface of the sleeve defines said wheel.

10. Cleaning apparatus according to claim 9, wherein the wheel is defined by a flange on the outer surface of the sleeve.

11. Cleaning apparatus according to claim 10, wherein the shaft is connected to said sleeve for rotation together when the cleaning member is in, or between, said extended or first retracted positions.

12. Cleaning apparatus according to claim 11, wherein the shaft is disconnected from said sleeve when in said second retracted position.

13. Cleaning apparatus according to claim 1, wherein the shaft and the sleeve are connected by a key and keyway connection so that the shaft is slidable in said sleeve between the extended and the retracted positions.

14. Cleaning apparatus according to claim 1, wherein the shaft has a reduced diameter portion that when aligned with said sleeve is not engaged therewith.

15. Cleaning apparatus according to claim 1, wherein the shaft has a lower portion that supports a plurality of cleaning elements.

16. Cleaning apparatus according to claim 15 wherein the cleaning elements are flexible.

17. Cleaning apparatus according to claim 16, wherein the cleaning elements are resiliently flexible.

18. Cleaning apparatus according to claim 15, wherein the cleaning elements are spaced radially and axially along the lower portion of the shaft.

19. Cleaning apparatus according to claim 1, wherein each cleaning member comprises cleaning elements that are flexible.

20. Cleaning apparatus according to claim 19, wherein the cleaning elements are resiliently flexible.

21. Cleaning apparatus comprising a support member supporting a plurality of cleaning members for rotational movement, a transmission means engaged with each cleaning member and for converting a driving force into rotation of the cleaning members, each cleaning member being movable relative to said support member between an extended position and a first retracted position whereby the cleaning members remain in driving engagement with said transmission means in both positions, characterised in that each cleaning member is movable to a second retracted position where it is closer to the support member than when in said first retracted position and is disengaged from said transmission means so that it is not driven in rotation, wherein the transmission means comprises a wheel associated with each cleaning member and rotatable therewith when the cleaning member is in said extended and said first retracted positions, each cleaning member comprising a shaft that is received in a sleeve, the shaft defining a longitudinal axis and being axially movable relative to the sleeve, an outside surface of the sleeve defining the wheel, and the wheel is defined by a flange on the outer surface of the sleeve.

22. Cleaning apparatus according to claim 21, wherein each cleaning member is movable to a plurality of positions between the extended position and the first retracted position.

23. Cleaning apparatus according to claim 21, wherein the wheels of the cleaning members are in driving engagement with each other so that rotation of one cleaning member causes rotation of the others.

24. Cleaning apparatus according to claim 21, wherein the shaft is connected to said sleeve for rotation together when the cleaning member is in, or between, said extended or first retracted positions.

25. Cleaning apparatus according to claim 21, wherein the shaft and the sleeve are connected by a key and keyway connection so that the shaft is slidable in said sleeve between the extended and the retracted positions.

* * * * *

UNITED STATES PATENT AND TRADEMARK OFFICE
CERTIFICATE OF CORRECTION

| | | |
|---|---|---|
| PATENT NO. | : 8,245,344 B2 | Page 1 of 1 |
| APPLICATION NO. | : 11/721860 | |
| DATED | : August 21, 2012 | |
| INVENTOR(S) | : Tim F. Kilpatrick | |

It is certified that error appears in the above-identified patent and that said Letters Patent is hereby corrected as shown below:

In claim 11, page 5, lines 1-4:

change "Cleaning apparatus according to claim 10, wherein the shaft is connected to said sleeve for rotation together when the cleaning member is in, or between, said extended or first retracted positions." to --Cleaning apparatus according to claim 1, wherein the shaft is connected to said sleeve for rotation together when the cleaning member is in, or between, said extended or first retracted positions.--

Signed and Sealed this
Twenty-seventh Day of November, 2012

David J. Kappos
*Director of the United States Patent and Trademark Office*